United States Patent
Kettler et al.

[11] Patent Number: 5,929,998
[45] Date of Patent: Jul. 27, 1999

[54] METHOD FOR MATCHING A COLOUR FORMULATION

[75] Inventors: Wilhelm Kettler; Matthias Kolb; Albert Tacke, all of Wuppertal, Germany

[73] Assignee: Herbert GmbH, Wuppertal, Germany

[21] Appl. No.: 08/915,781

[22] Filed: Aug. 21, 1997

[30] Foreign Application Priority Data

Sep. 10, 1996 [DE] Germany .............. 196 36 774

[51] Int. Cl.⁶ .................................................. G01J 3/50
[52] U.S. Cl. ................................ 356/405; 356/425
[58] Field of Search ........................... 356/402, 405, 356/406, 425

[56] References Cited

U.S. PATENT DOCUMENTS

| | | | |
|---|---|---|---|
| 3,601,589 | 8/1971 | McCarty | 356/402 |
| 3,916,168 | 10/1975 | McCarty et al. | 356/405 |
| 5,668,633 | 9/1997 | Cheetam et al. | 356/402 |
| 5,740,078 | 4/1998 | Cheetam et al. | 356/402 |

FOREIGN PATENT DOCUMENTS

| | | |
|---|---|---|
| 42 43 885 | 6/1994 | Germany . |
| 43 09 802 | 9/1994 | Germany . |
| 44 20 260 | 12/1995 | Germany . |

*Primary Examiner*—F. L. Evans
*Attorney, Agent, or Firm*—Merchant Gould Smith Edell Welter & Schmidt

[57] ABSTRACT

This invention relates to a method for matching a color formulation to a color shade model in the field of a color- and/or effect-imparting surface coating. The reflecting surface of a color shade, which is to be rematched, of a colored surface coating is determined metrologically over the visible spectral region using a goniometric spectral photometer with variation of the angle of measurement. The associated standard tristimulus values and/or the vectors in the CIELAB color solid which are derived therefrom are calculated from the measured reflection factors or spectral energy factors. Those formulations and/or color shades which exhibit reflection properties or properties derived therefrom which are the most similar to the measured color shade model are subsequently identified from a formulation database by means of the reflection spectra or the calorimetric dimensional numbers derived therefrom. By means of a computer-generated effect matrix, the metrologically determined, angle-dependent color difference between the desired color shade, i.e. the color shade to be rematched, and the actual color shade, i.e. the color shade corresponding to the nearest formulation from the formulation database, is minimized by means of a computer algorithm for function minimization taking into consideration secondary conditions in the sense of the $L_2$ standard, and a corrected formulation is produced.

3 Claims, 5 Drawing Sheets

METHOD FOR MATCHING A COLOUR FORMULATION

This invention relates to a method for matching a known reference colour formulation to a colour shade model, which differs therefrom, in the field of a colour- and/or effect-imparting surface coating. The method is employed in particular for the coating of vehicles and vehicle parts for repair purposes and for the correction of production batches in lacquer manufacture.

It is customary and necessary in lacquering shops and in the lacquer industry for a defined colour shade to have to be rematched, corresponding to a colour shade model, using the lacquer to be applied. For example, the colour shade model may be a vehicle body on which paintwork damage is to be repaired, or it may be a lacquer which is to be manufactured with a defined colour shade in production. The lacquerer generally has a mixing bank comprising a multiplicity of mixed lacquers or colorant pastes at his disposal in a lacquering shop, from which he can produce the original colour shade of the vehicle with the aid of colour formulations or mixing formulae. Due to various external influences, however, the colour effect of the vehicle or body part often differs from the original colour shade. The lacquerer then has the task, using as few shade-matching steps as possible, of matching the original colour shade, which he produces by means of a mixing formula for example, to the colour shade of the vehicle or body part to be repaired. Matching is effected by slight but critical variations in the amounts of pigments added to the mixing formula. This shade-matching procedure, which comprises visual colour matching, can traditionally only be carried out by well trained and educated specialist personnel, and is still the customary procedure in many lacquering shops today.

However, this visually effected shade-matching procedure has been increasingly supported in recent years by instruments for the instrumental characterisation of lacquers or pigment mixtures. Apart from what are termed colorimeters, spectral photometers are preferably used nowadays, by means of which the reflection properties of coated surfaces in the visible spectral region can be determined metrologically for a predetermined angle of illumination and angle of measurement.

All the components of the associated vector of the standard tristimulus values can be obtained from the convolution of the measured reflection factor with one type of light and one of the standard spectral value functions in each case. For coatings which are free from effect pigments, apart from the gloss angle and thus the associated vector in the colour solid also, the reflection factor is independent of the choice of the angle of illumination and the angle of observation. For these lacquers, which are termed single-colour lacquers, one measuring geometry is thus sufficient for a complete characterisation of their reflection properties.

However, many lacquers contain lamellar effect-imparting substances which scatter light in a strongly anisotropic manner, such as aluminium, interference or liquid crystal pigments, holographic pigments or micronised titanium dioxide for example, which impart special visually changing effects to the coating. The perceived colour impression of a coating of this type varies with the angle of observation (brightness and/or colour flop). Since the reflection factor of these lacquers varies with the angle of illumination or observation, one measuring geometry is no longer sufficient for the instrumental characterisation thereof. For this specific application, goniometric spectral photometers have become more widely used, by means of which a sufficiently large reflection surface which is matched to the application concerned can be measured as a function of angle and wavelength using a plurality of different measuring geometries. The information obtained can then be employed to form a reference colour shade model to provide instrumental support for the matching of effect colour shades.

A procedure is employed in this connection in which the effects of changes in concentration of the individual pigments on the reflection factors or on colorimetric dimensional numbers derived therefrom are firstly determined, and this information is then used to calculate the manner in which the amounts of pigments must be varied in order to match the desired colour shade. The disadvantage of this method of correction is that the effects of changes in concentration of the individual pigments on the reflection factor have to be determined experimentally for each formulation. This results in a considerable, time-consuming shade-matching operation, which in a lacquering shop for example has a negative effect on vehicle throughput per unit time and considerably reduces efficacy. The use of this method for correcting production batches in lacquer production results in production times which are significantly lengthened.

The object of the present invention was therefore to provide a method for correcting or matching reference colour formulations to a defined colour shade model, for example to a body part to be repaired or to a wet lacquer which is to be produced with a fixed, predetermined colour shade, which procedure minimises the cost of shade-matching and which enables a colour formulation to be matched in a visually acceptable manner to a colour shade which is to be repaired or corrected, without a considerable consumption of time.

This object is achieved by a correction method in which, as a preliminary step of the correction operation, the colouristic effect matrix, which describes the concentration-dependence of the colour location at the metrologically determined angles in the colour solid, is determined by computer based on optical material parameters which are determined from a calibration table for a given formulation.

The correction method according to the invention is characterised in that 1) in a first step, the reflecting surface of a colour shade, which is to be rematched, of a coloured surface coating is determined metrologically over the visible spectral region using a goniometric spectral photometer with variation of the angle of measurement, 2) the associated standard tristimulus values and/or the vectors in the CIELAB colour solid which are derived therefrom are calculated from the measured reflection factors or spectral energy factors, 3) those formulations and/or colour shades which exhibit reflection properties or properties derived therefrom which are the most similar to the measured colour shade model are subsequently identified from a formulation database with the aid of the reflection spectra or the calorimetric dimensional numbers derived therefrom, 4) with the aid of a computer-generated effect matrix produced by computer as a preliminary step, the metrologically determined, angle-dependent colour difference between the desired colour shade (the colour shade to be rematched) and the actual colour shade (the colour shade corresponding to the nearest formulation from the formulation database) is minimised by means of a computer algorithm for function minimisation taking into consideration secondary conditions in the sense of the $L_2$ standard, and a corrected formulation is produced, wherein the effect matrix is established by a) experimentally determining, by means of a calibration table and using a goniometric spectral photometer, the reflection surfaces for each pigment which forms the basis of the formulations from the formulation database at a plurality of angles within the required spectral region, b) determining the optical material parameters for each pigment forming the basis of the formulations from the formulation database by adapting the radiation transfer equation to the experimentally determined reflection surfaces, and c) computer determination, by means of the radiation transfer equation, of the colouristic effect matrix, which describes the angular dependency of the colouristic effect in the reflection solid or colour solid when the pigment concentrations are varied, for the entire formulation content of the formulation database, and storage of the effect matrix in the database.

A lacquer and/or a surface coating is advantageously produced corresponding to the corrected formulation as a reference model and the procedure according to the invention is repeated using the reference model as the actual colour shade in relation to the desired colour shade.

When there are tolerable residual colour differences between the colour shade model and the reference model the corrected formulation can be used for repairs. When there are residual colour differences which are not tolerable, the reference model (e.g. the coated panel) of the last correction step can be measured using a goniometric spectral photometer and can be provided with the associated formulation. The corrected panel then functions as the actual formulation with which the effect matrix of the initial formulation for the next correction step is associated, which next step is then carried out using these new data.

The procedure according to the invention is advantageously reiterated repeatedly, wherein the reference model of the preceding procedural operation is used each time as the actual colour shade of the following procedural operation.

The reflection surfaces of the colour shade model which are determined in 1) are determined metrologically using a goniometric spectral photometer. In this respect, the measuring geometry is the same as that which is described in detail below for establishing the effect matrix (4a). The colour shade to be measured may be that of a body part or of a liquid lacquer, for example.

The triplet of the associated standard tristimulus values or the tristimulus values in the CIELAB colour solid which are derived therefrom are subsequently calculated from the measured reflection factors of the colour shade model.

The correction system is based on a formulation database which contains the colour shades or mixing formulae which are established for all known colour shade models. Moreover, for each colour shade the database contains the associated reflection surfaces or the colorimetric dimensional numbers calculated therefrom. A comparison of the reflection surfaces which are measured on the colour shade model to be rematched, or of the colorimetric dimensional numbers calculated therefrom, with the reflection surfaces stored in the formulation database gives a number n of formulations (where n is 1 to 5, for example) which are nearest to the colour shade model. The actual reference formulation which is to be corrected can be selected therefrom, taking further criteria into consideration.

The information content of the effect matrix which is determined as a preliminary step and which is stored in the database is then utilised to simulate the shade-matching operation by computer, and to vary the shade of the initial formulation in the direction of the colour shade model.

A detailed description is given below of how the effect matrix which is established as a preliminary step is determined in particular.

A prerequisite for the establishment of the effect matrix is a knowledge of the optical material parameters of all the mixed lacquers or pigments from which a colouring system (lacquer) is built up.

The optical material parameters are determined by matching the radiation transfer equation in the sense of the $L_2$ standard to the experimentally determined reflection factors or spectral energy factors for each pigment.

In the case of single-colour pigments, the known Schuster/Kubelka/Munk approximation of the radiation transfer equation is completely satisfactory. Within the scope of this dual flux approximation, a simple relationship can be derived between the reflection R of an opaque lacquer coat and the scattering properties (S) and absorption properties (K) of the pigments contained in this coat:

$$R = \alpha r_{ext} + \frac{(1 - r_{ext})(1 - r_{int})R_\infty}{1 - r_{int}R_\infty}$$

where $$R_\infty = 1 \div \frac{k}{s} - \sqrt{\left(1 \div \frac{k}{s}\right)^2 - 1}$$

The external ($r_{ext}$) and internal ($r_{int}$) coefficients of reflection correct the reflection effects which occur at the air/lacquer interface (Saunderson correction). The parameter $\alpha$ must be set to one when there is a gloss effect, and must be set to zero when gloss is excluded. The scattering and absorption coefficients are additively composed of the individual contributions of the different pigment species of respective concentration $c_i$:

$$K = \sum_{i=1}^{N} c_i K_i \qquad S = \sum_{i=1}^{N} c_i S_i$$

These reflection-specific, wavelength-dependent material parameters have to be determined experimentally via a calibration table.

However, this dual flux model is insufficient for describing the reflection indicatrix of effect colour shades. In this case, it is at least the azimuth-dependent form of the radiation transfer equation $$\mu \frac{d(x, \mu)}{dx} = -(\kappa + \sigma)/(X, \mu) - \frac{\sigma}{2}\int_{-1}^{1} p(\mu, \mu')/(X, \mu')d\mu' + \frac{\sigma}{4\pi}\int_0 p(\mu_1 - \mu_0)e^{-(\kappa+\sigma)X/\mu_0}$$

or a more generally applicable theoretical model which must be solved to a sufficient approximation in order to describe the diffusion of radiation in pigmented media. This links the intensity $I(x,\mu)$ of the radiation at a geometric depth x with the optical material parameters of the pigments. In addition to the absorption coefficient ($\kappa$) and the scattering coefficient ($\sigma$), the phase function $p(\mu,\mu')$ has to be determined here. This describes the angular dependence of the scattering of light at the individual pigment particles, wherein $\mu=\cos\theta$ ($\theta$=scattering angle). The phase function is also additively composed of the individual contributions weighted in terms of the respective pigment concentration. The absorption coefficient, the scattering coefficient and the phase function again have to be determined experimentally via a calibration table. If these material quantities are known, the reflection behaviour of any pigmented opaque lacquers can be quantitatively calculated for each measuring geometry with the aid of the radiation transfer equation.

The optical material parameters describe the properties of the pigments which are dispersed in the binder vehicle system concerned. They depend on the wavelength and have to be determined for each desired wavelength. In the simplest case, a specific set of optically opaque calibration tables is prepared for each pigment, and the reflection factor or the spectral energy factor is measured with a goniometric spectral photometer for various geometries of illumination and observation in the spectral region of interest. The material parameters are then determined by adapting the radiation transfer equation to these experimental data in the sense of the $L^2$ standard.

Figure 1A:
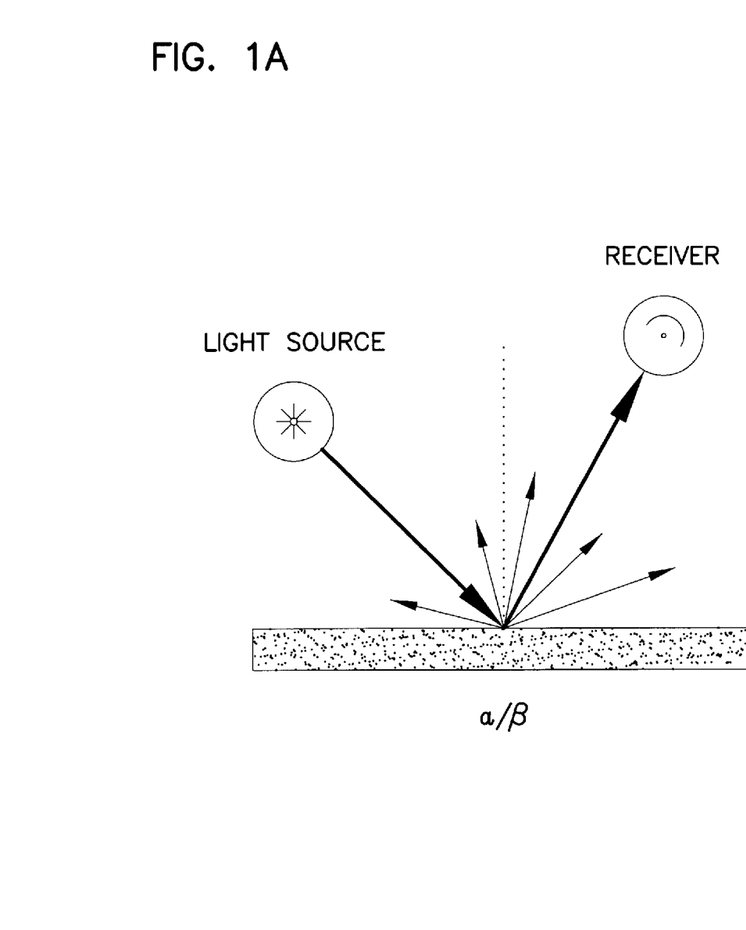
FIGS. 1A and 1B: Illustrates the geometric conditions for the instrumental characterisation of the reflection properties of surface coatings. Receiver- (on the left) or illumination-modulated measuring arrangements (on the right) can be used, or a combination of both can be used.
Figure 1B:
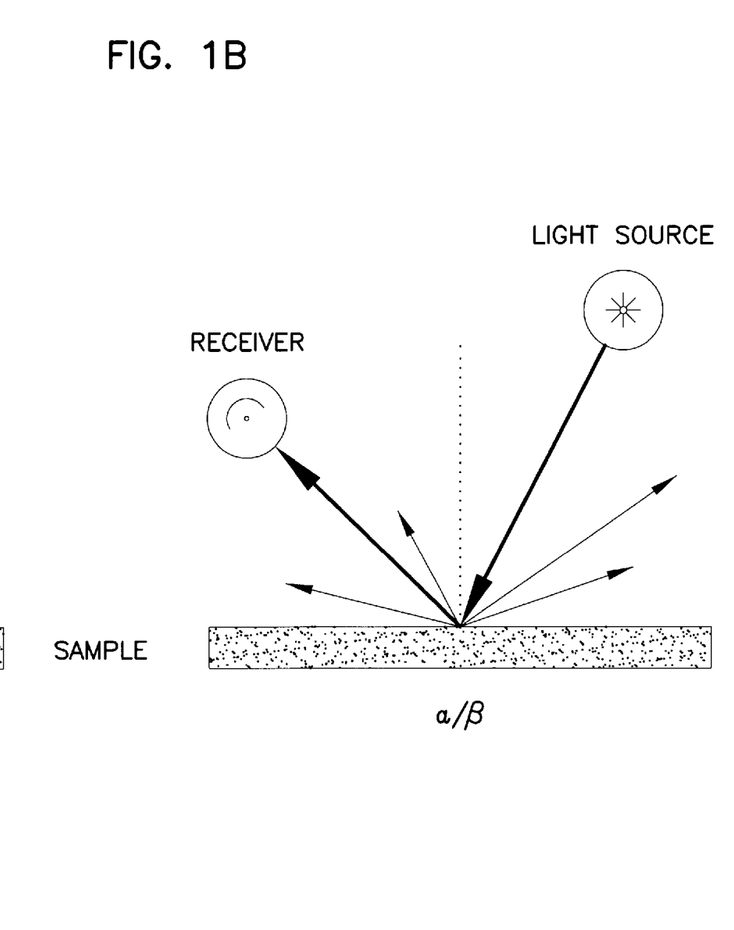
Figure 2:
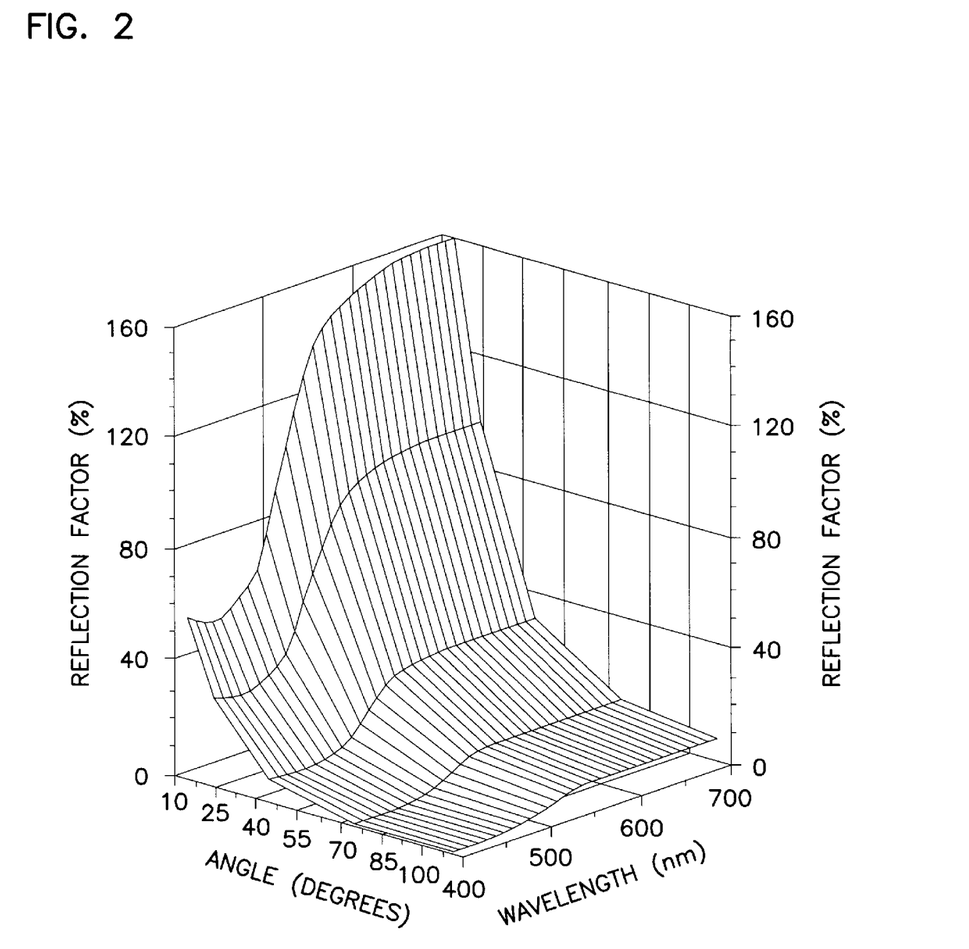
FIG. 2: Illustrates the reflection factor of a yellow effect colour shade as a function of wavelength and angle at a constant angle of irradiation (receiver-modulated measuring geometry).

A fixed or portable goniometric spectral photometer having a symmetrical or asymmetrical measuring geometry can be used for the metrological determination of the reflection surfaces. The angular range of observation to be covered depends on the approximation of the radiation transfer equation which is used in each case. Both instruments with illumination modulation and instruments with observation modulation can be used (see FIGS. 1A and 1B). For a symmetrical measuring geometry, illumination (observation) perpendicular to the sample surface is employed, and observation (illumination) is effected at different polar angles $\theta (0°<\theta<90°)$. The aperture of the illumination and observation lens should not be too large. Alternatively, when an asymmetric measuring geometry is used, illumination (observation) can be effected at a polar angle of 45°, and a plurality of angles $\epsilon$ from the range $0°<\epsilon<90°$ can be selected for observation, wherein $\epsilon$ is to be understood as the difference angle in relation to the gloss angle (see FIGS. 1A and 1B).

In order to determine the colouristic effect matrix, the amounts of the formulation components (N pigments) are varied slightly about their desired concentration and the associated colouristic effect in the reflection solid or in the CIELAB colour solid are calculated as a function of the angle (M angles) by means of the optical material parameters, i.e. the effects of the changes in concentration of formulation constituents, the material parameters of which are known, can be calculated as effects in the colour solid or in the reflection solid.

The correction method according to the invention is based on the concept of expanding a function which describes the colouristic properties of a colour formulation to a first order as a Taylor series about the desired point, and on using this information so as to be able to match the shade of a reference formulation to a sample formulation which differs from the desired point. The functions which are provided here are the measured reflection values or colorimetric dimensional numbers derived therefrom such as the triplet of the colour coordinates in the CIE standard colorimetry system or in the CIELAB colour solid.

According to Grassmann's third law, continuous transitions exist everywhere between the colours. Consequently, a mixing function in the colour solid or in the reflection solid can always be expanded as a Taylor series. This mixing function f is generally a vector function, the series expansion of which can be represented in component notation as $$f_1^{(k)} \cong f_1^{(k)}(c_o) + \sum_{i=1}^{N} \Delta c_i \frac{\partial f_1^{(k)}(c_o)}{\partial c_i} + \frac{1}{2} \sum_{l=1}^{N} \sum_{m=1}^{N} \Delta c_i \Delta c_m \frac{\partial^2 f_1^{(k)}(c_o)}{\partial c_l \partial c_m} + \ldots$$

$$f_2^{(k)} \cong f_2^{(k)}(c_o) + \sum_{i=1}^{N} \Delta c_i \frac{\partial f_2^{(k)}(c_o)}{\partial c_i} + \frac{1}{2} \sum_{l=1}^{N} \sum_{m=1}^{N} \Delta c_i \Delta c_m \frac{\partial^2 f_2^{(k)}(c_o)}{\partial c_l \partial c_m} + \ldots$$

$$\vdots$$

$$f_M^{(k)} \cong f_M^{(k)}(c_o) + \sum_{i=1}^{N} \Delta c_i \frac{\partial f_M^{(k)}(c_o)}{\partial c_i} + \frac{1}{2} \sum_{l=1}^{N} \sum_{m=1}^{N} \Delta c_i \Delta c_m \frac{\partial^2 f_M^{(k)}(c_o)}{\partial c_l \partial c_m} + \ldots$$

The raised exponent (k) denotes the respective measuring geometry (a maximum of K angles), and c and $c_0$, respectively, denote the N-component concentration vectors of a formulation. If colorimetric quantities are used, the M components of the mixing function are formed by the function triplet $$f = \begin{pmatrix} L*(c) \\ a*(c) \\ b*(c) \end{pmatrix}$$

where M=3. The above continuity argument for colour mixtures can also be applied directly to the reflection indicatrix, since the latter has an effect on the functional of the standard tristimulus values. Therefore, if the measured reflection spectrum is used for the correction, the mixing function vector is given by $$f = \begin{pmatrix} R(\lambda_1, c) \\ R(\lambda_2, c) \\ \vdots \\ R(\lambda_M, c) \end{pmatrix}$$

In vectorial representation, and taking into consideration all terms as far as those of first order, these equations can be expressed as the relationship $$\delta f^{(k)} = f^{(k)}(c) - f^{(k)}(c_0) \equiv W^{(k)} \Delta c$$

where $$W^{(k)} = \begin{pmatrix} \frac{\partial f_1^{(k)}(c_0)}{\partial c_1} & \frac{\partial f_1^{(k)}(c_0)}{\partial c_2} & \frac{\partial f_1^{(k)}(c_0)}{\partial c_3} & \ldots & \frac{\partial^{(k)}(c_0)}{\partial c_N} \\ \frac{\partial f_2^{(k)}(c_0)}{\partial c_1} & \frac{\partial f_2^{(k)}(c_0)}{\partial c_2} & \frac{\partial f_2^{(k)}(c_0)}{\partial c_3} & \ldots & \frac{\partial f_2^{(k)}(c_0)}{\partial c_N} \\ \vdots & & & \ddots & C \\ \frac{\partial f_M^{(k)}(c_0)}{\partial c_1} & \frac{\partial f_M^{(k)}(c_0)}{\partial c_2} & \frac{\partial f_M^{(k)}(c_0)}{\partial c_3} & \ldots & \frac{\partial f_M^{(k)}(c_0)}{\partial c_N} \end{pmatrix}$$

represents what is termed the effect matrix, and $$\Delta c = \begin{pmatrix} \Delta c_1 \\ \Delta c_2 \\ \vdots \\ \Delta c_N \end{pmatrix}$$

represents the vector of the concentration deviations about the desired point $C_0$. With the aid of the known optical material parameters of a mixed lacquer system, this relationship can be generated by computer for each given formulation from the solution of the radiation transfer equation. For this purpose, the amounts of formulation components (pigment N) are slightly varied about their desired concentration, the associated colouristic effect in the reflection solid or in the colour solid is determined as a function of angle in the reflection solid or in the colour solid (angle M) and the information obtained is stored in the database associated with the corresponding formulation.

The information content of the effect matrix can then be used immediately or at any subsequent time in order to match the shading of a reference formulation to that of a sample point which differs from the reference point. However, this sample point must only differ from the reference point by an extent such that the range of validity of the approximation used is not exceeded and such that any mutual interdependence of the shading components can be neglected. In the sense of the correction of the formulation, the vector $f^{(k)}(c_o)$ describes the colouristic properties of the original or reference formulation for the measuring geometry k, whilst $f^{(k)}(c)$ represents the body part or liquid lacquer which is measured, for example (desired formulation). The difference $\delta f^{(k)}$ between the desired and the reference colour shades is minimised by modifying the pigment concentration vector c. For this purpose, the minimum of the error square function $$\phi = \sum_{k=1}^{K} p_k \sum_{i=1}^{M} \left\{ \delta f_i^{(k)} - \sum_{j=1}^{N} \Delta c_j \frac{\partial f_i^{(k)}(c_o)}{\partial c_j} \right\}^2 = \min$$

has to be determined, with the boundary condition that the amounts added $c_i$ are always positive. Moreover, an angle-dependent weighting can be effected using the factor $p_k$. These calculated amounts to be added are incorporated in the reference formulation, which is subsequently converted to 100% again.

A corrected colour formulation is thus available.

Thus, as a preliminary step, i.e. without intervening in the actual coating operation or in the shade-matching step in the production of the lacquer, the effect matrices are generated by computer for the entire formulation content of a colour formulation database, and the results obtained are stored in the colour formulation database. The lacquerer or the person concerned with production therefore receives, very rapidly and locally from the computer, the requisite information for correcting the formulation.

A reference model is subsequently produced with the aid of the corrected formulation. For example, a lacquer produced according to the corrected colour formulation is applied to a reference panel and is visually or metrologically compared with the body part to be repaired. Alternatively, a lacquer produced according to the corrected formulation is measured and is compared metrologically with the reference wet lacquer. If the residual colour differences are tolerable, the corrected formulation can be used. If matching of the colour shade is still not acceptable, or if the measured reflection values still do not correspond satisfactorily, one or more of the correction steps described above can be added.

With the correction procedure according to the invention, it is possible, in a lacquering shop or in lacquer production for example, to minimise time-consuming shade-matching operations and to produce colour shades which are well matched to a colour model, for example a body part or a colour shade to be manufactured in production. In this respect, the computer-bound step of calculating the colour formulation, particularly for effect colour shades, can be circumvented on site, i.e in the lacquering shop or during the production of lacquer for example. The computer-bound part of the establishment of the effect matrix for given formulations has already been effected as a preliminary step. In the lacquering shop, or during the production of lacquer, the only slight numerical input required is that for the correction of the formulation.

A further advantage of the correction procedure according to the invention is that it can be employed for any type of pigments (e.g. lamellar absorption pigments, micronised titanium dioxide, metallic pigments, interference pigments, liquid crystal pigments). An immense computing effort and time requirement has hitherto been necessary for the correction of effect pigment formulations compared with that required for single-colour pigment formulations. The use of the comprehensive optical material parameters of the pigments, which are determined from a calibration table with the aid of the radiation transfer equation, enables an exact consideration of the characteristic angle-dependency to be incorporated in the reflection factor when the correction procedure according to the invention is used.

The invention is explained in more detail below with reference to the drawings and to the examples.

The Figures are as follows.

Table I: Is a compilation of the data (components with associated concentrations and colorimetric dimensional numbers) for the example of the correction of the formulation of a yellow effect colour shade shown in FIGS. 2 and 3A, 3B and 3C.

Table II: Is a compilation of the data (components with associated concentrations and colorimetric dimensional numbers) for the example of the correction of the formulation of a green effect colour shade shown in FIGS. 4 and 5A, 5B and 5C.

By way of example, two examples of actual measurements on real samples with specific colour differences of different magnitudes between the reference formulation and the desired formulation (body part) are presented in order to demonstrate the capability of the correction procedure. The data presented are typical of repair practice, and contain the same pigments but in different quantitative proportions. The effect matrix was determined by computer for one formulation (the reference formulation) with the aid of the optical calibration data. Colorimetric dimensional numbers (L*(θ), a*(θ),b*(θ)) were employed to provide a better overall view. The effect matrix for the reference formulation and the measured specific colour differences (ΔL*(θ),Δa*(θ),Δb*(θ)) between the reference formulation and the desired formulation were used to calculate the requisite changes in concentration for the reference formulation, in order to match the shade of the reference formulation to that of the desired formulation.

A conventional two-coat system (base lacquer-clear lacquer structure) was used as the lacquer system. All the optical material parameters of the radiation transfer equation, which were determined via a calibration table and which were necessary for the correction operation, were available for the mixed lacquers of this system. All the reflection surfaces (calibration table and examples) were measured using a portable X-rite MA68 goniometric spectral photometer, which illuminated the samples at an angle of 45° and observed the reflected radiation at angles of 15°, 25°, 45°, 75° and 110°. However, the 110° angle could only be used for colour shade assignment and not for the correction procedure. The reflection factor of a colour shade was measured experimentally in the 400 nm≦λ≦700 nm spectral region, at intervals of 20 nm, and was interpolated to give a supporting point spacing of 10 nm. The components of the associated location vector $(\Delta L^*(\theta), \Delta a^*(\theta), \Delta b^*(\theta))$ in the CIELAB colour solid were calculated from the measured, angle-dependent reflection spectra.

EXAMPLE 1

Figure 3A:
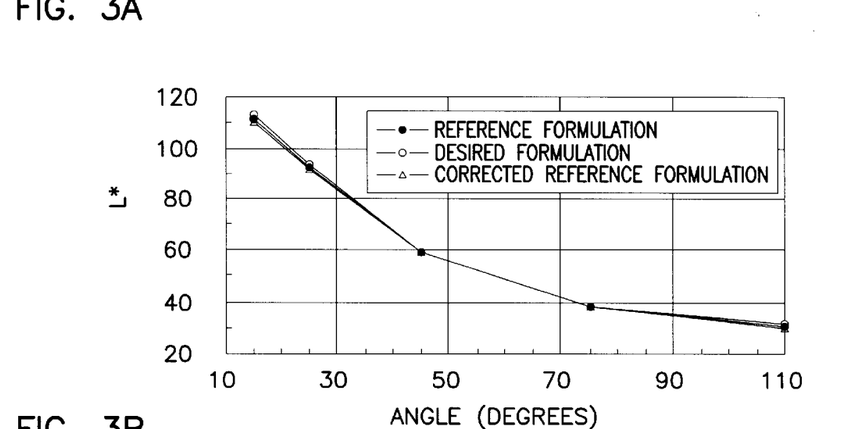
FIGS. 3A, 3B and 3C: Illustrates the angular variation of the components of the colour vector (L*, a*, b*) in the CIELAB colour solid for the reference formulation, desired formulation and corrected reference formulation, for the example of the reflection indicatrix of a yellow effect colour shade shown in FIG. 2.
Figure 3B:
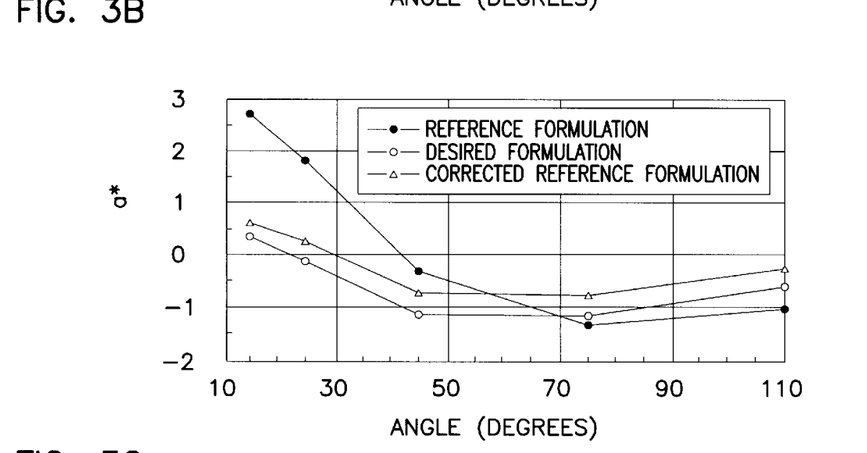
Figure 3C:
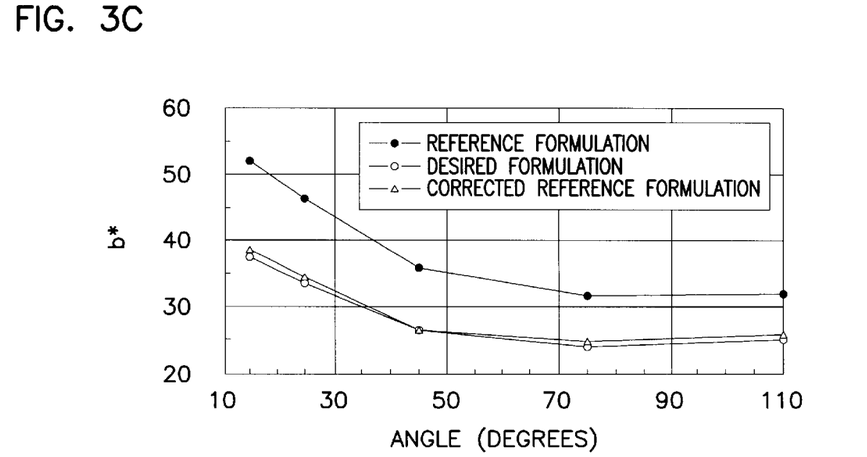
Figure 4:
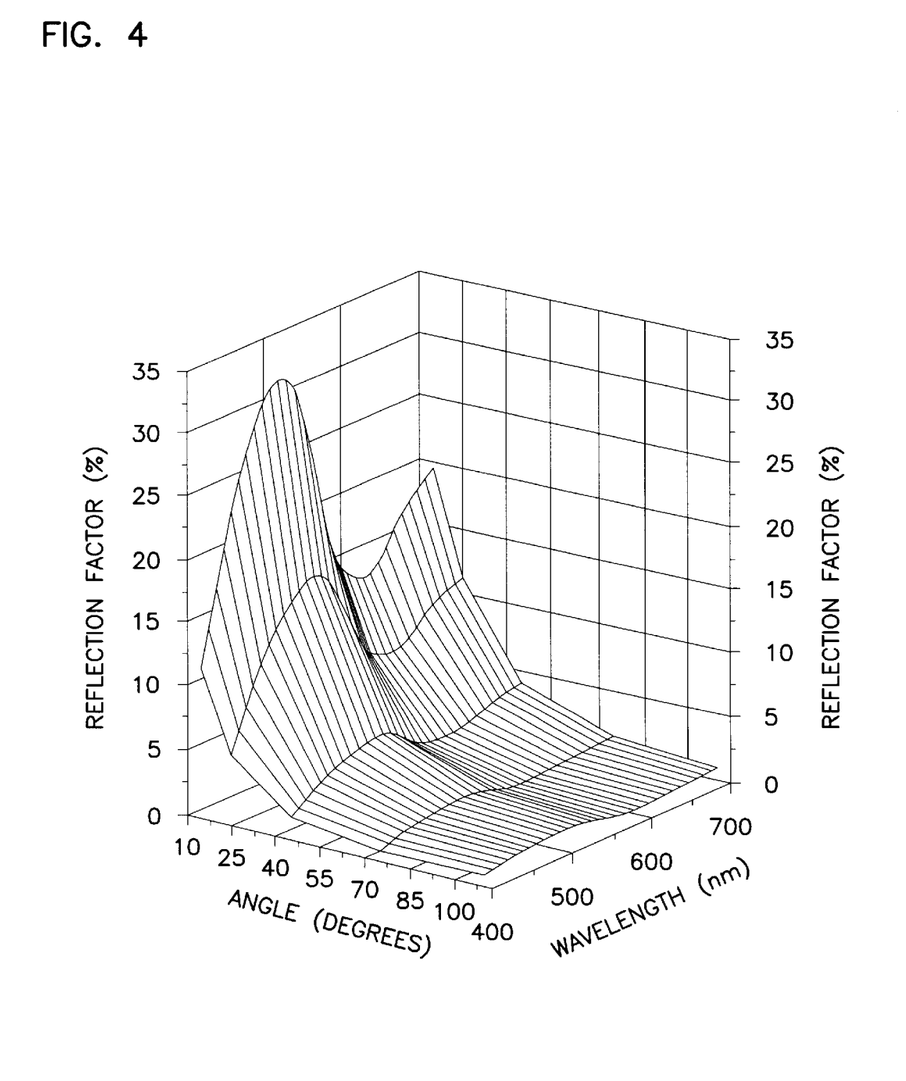
FIG. 4: Illustrates the reflection factor of a green effect colour shade as a function of wavelength and angle at a constant angle of irradiation (receiver-modulated measuring geometry).

In the first example, in which the specific colour differences between the reference formulation and the desired formulation were very large, a conventional aluminium pigment was used as an effect-imparting pigment in combination with four coloured components (commercially available absorption pigments). At the predetermined mixture ratios, these resulted in a yellow colour shade. In addition, the formulation contained a matting agent which did not in fact itself contribute directly to the coloration, but which had an indirect effect on the angular course of the reflection surface by disturbing the alignment of the Al pigments. The reference formulation associated with the desired formulation was to be shaded to match the desired formulation, wherein the components were fixedly predetermined by the reference formulation. An effect matrix was associated with this reference formulation, and the information content of this effect matrix was used for the actual correction step. In the repair coating field, the desired formulation corresponds to a body part to be repaired, whilst in the field of production the desired formulation corresponds to a standard to be achieved, the colour shade of which is to be produced by a mixer for the formulation applied. All the components of the reference formulation had to be altered to a greater or lesser extent so as to be able to rematch the desired colour shade. All the significant results of the correction operation, such as the actual formulation constituents with their concentration (reference, desired and corrected formulation), the (experimental) colorimetric dimensional numbers of the reference formulation and the (experimental) specific initial colour differences between the desired and the actual formulation are listed in Table I. As can be seen from these data, not only were the correct components modified, but the direction and order of magnitude of the correction for the reference formulation were in excellent agreement with the anticipated values. The experimental specific calorimetric dimensional numbers of the reference, desired and corrected formulations are shown in FIG. 3. It is also abundantly clear here that the correction step significantly reduced the specific initial colour differences. The first correction step brought the reference formulation so near to the desired formulation that the remaining residual colour difference could be compensated for without problems by adaptation of the application parameters for the repair of body parts.

EXAMPLE 2

Figure 5A:
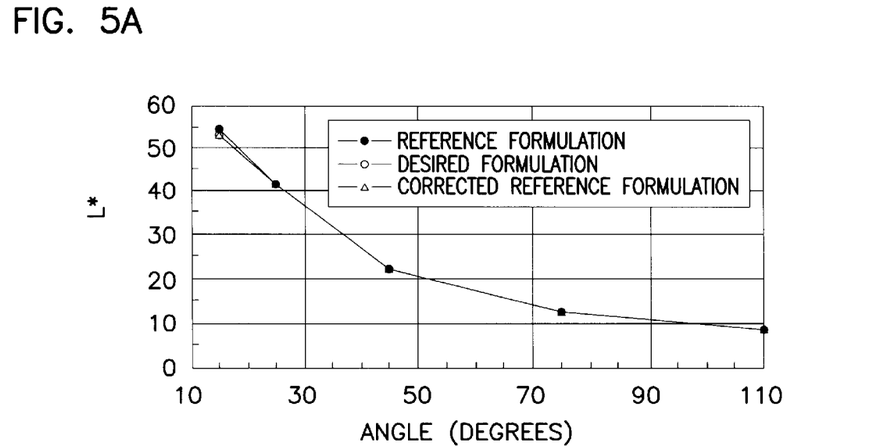
FIGS. 5A, 5B and 5C: Illustrates the angular variation of the components of the colour vector (L*, a*, b*) in the CIELAB colour solid for the reference formulation, desired formulation and corrected reference formulation, for the example of the reflection indicatrix of a green effect colour shade shown in FIG. 2.
Figure 5B:
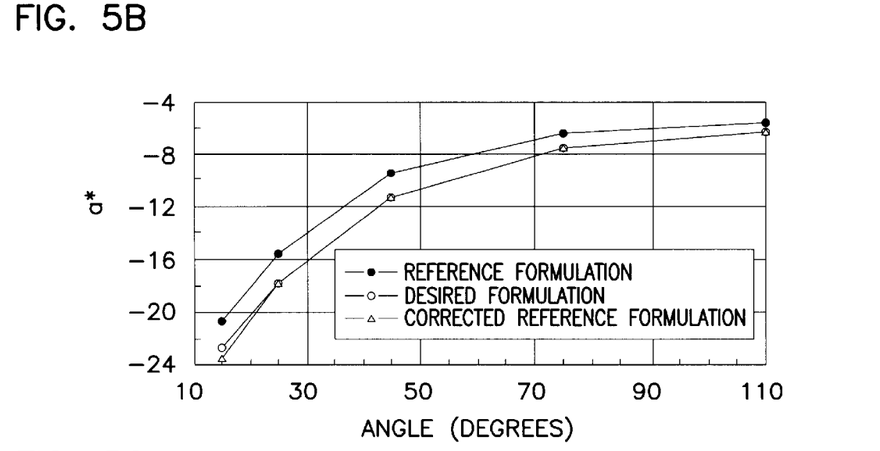
Figure 5C:
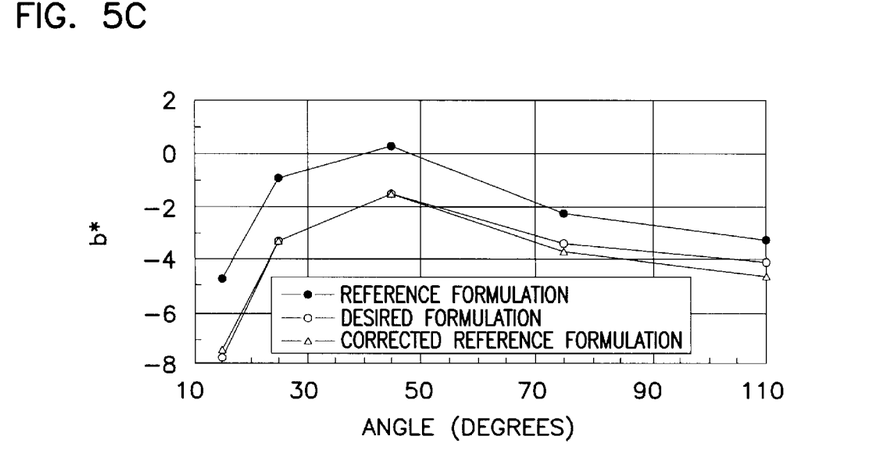

Compared with the first example, the specific colour differences between the reference and desired formulations are significantly less in the second example of a green effect colour shade. However, a mixture of two green mica-based interference pigments with different particle size distributions and an $Fe_2O_3$-coated Al pigment was used as the effect-imparting substance here. In addition, the formulation contained three further coloured pigments and a matting agent. As in the first example, the right components of the actual formulation were again corrected, and the direction and order of magnitude were in very good agreement with the anticipated values. All the significant results of the correction operation, such as the actual mixed lacquers used with their concentrations, as well as the experimental colorimetric dimensional numbers, are given in Table II. The experimental specific colorimetric dimensional numbers are also illustrated in FIGS. 5A, 5B and 5C. The mean colour difference was reduced to $<\Delta E> \sim 0.5$ by the correction of the actual formulation which, with a mean colour difference of $<\Delta E> \sim 2.4$, was unsatisfactory for a spot repair; the mean colour difference can be further minimised by the application technique. This example of a correction was also suitable for spot repair purposes.

TABLE Ia

| | Reference formulation | | | | | Desired fomulation difference from reference formulation | | | | |
|---|---|---|---|---|---|---|---|---|---|---|
| Pigment | c (%) | Angle (degrees) | L* | a* | b* | c (%) | ΔL* | Δa* | Δb* | $\Delta E_{ab}^*$ |
| coarse Al | 78.18 | | | | | 83.44 | | | | |
| yellow 1 | 11.67 | 15 | 111.11 | 2.72 | 51.89 | 7.36 | 2.01 | −2.38 | −14.31 | 14.65 |
| red | 0.58 | 25 | 91.50 | 1.83 | 46.35 | 0.98 | 1.49 | −1.94 | −12.84 | 13.07 |
| carbon black | 0.82 | 45 | 58.97 | −0.30 | 36.20 | 1.47 | 0.33 | −0.78 | −9.73 | 9.77 |
| yellow 2 | 5.83 | 75 | 38.60 | −1.31 | 31.51 | 3.68 | −1.03 | 0.16 | −7.50 | 7.57 |
| effect additive | 2.92 | 110 | 32.35 | −1.02 | 31.84 | 3.07 | −1.59 | 0.43 | −6.86 | 7.05 |

TABLE Ib

| | Reference formulation | | | | | Desired formulation difference from reference formulation | | | | |
|---|---|---|---|---|---|---|---|---|---|---|
| Pigment | c (%) | Angle (degrees) | L* | a* | b* | c (%) | ΔL* | Δa* | Δb* | ΔE$_{ab}$* |
| coarse Al | 83.44 | | | | | 83.10 | | | | |
| yellow 1 | 7.36 | 15 | 113.12 | 0.34 | 37.58 | 8.10 | 2.46 | −0.28 | −1.08 | 2.70 |
| red | 0.98 | 25 | 92.99 | −0.11 | 33.72 | 1.10 | 0.63 | −0.39 | −0.91 | 1.17 |
| carbon black | 1.47 | 45 | 59.30 | −1.08 | 26.47 | 1.40 | −0.45 | −0.41 | −0.32 | 0.64 |
| yellow 2 | 3.68 | 75 | 37.57 | −1.15 | 24.01 | 4.00 | −0.39 | −0.41 | −0.61 | 0.83 |
| effect additive | 3.07 | 110 | 30.76 | −0.59 | 24.98 | 2.20 | −0.33 | −0.39 | −0.82 | 0.96 |

TABLE IIa

| | Reference formulation | | | | | Desired fomulation difference from reference formulation | | | | |
|---|---|---|---|---|---|---|---|---|---|---|
| Pigment | c (%) | Angle (degrees) | L* | a* | b* | c (%) | ΔL* | Δa* | Δb* | ΔE$_{ab}$* |
| interference green 1 | 7.69 | | | | | 7.55 | | | | |
| interference green 2 | 37.95 | 15 | 54.29 | −20.78 | −4.72 | 38.27 | −1.13 | −1.91 | −2.94 | 3.68 |
| Fe$_2$O$_3$-coated Al | 9.23 | 25 | 41.28 | −15.67 | −0.92 | 8.06 | −0.81 | −2.14 | −2.36 | 3.29 |
| blue | 15.38 | 45 | 22.75 | −9.32 | 0.30 | 17.12 | −0.22 | −1.87 | −1.21 | 2.24 |
| carbon black | 14.36 | 75 | 12.69 | −6.52 | −2.31 | 12.89 | −0.22 | −1.01 | −1.18 | 1.57 |
| yellow | 13.33 | 110 | 9.09 | −5.54 | −3.38 | 13.09 | −0.15 | −0.60 | −0.84 | 1.04 |
| effect additive | 2.06 | | | | | 3.02 | | | | |

TABLE IIb

| | Reference formulation | | | | | Desired fomulation difference from reference formulation | | | | |
|---|---|---|---|---|---|---|---|---|---|---|
| Pigment | c (%) | Angle (degrees) | L* | a* | b* | c (%) | ΔL* | Δa* | Δb* | ΔE$_{ab}$* |
| interference green 1 | 7.55 | | | | | 6.87 | | | | |
| interference green 2 | 38.27 | 15 | 53.16 | −22.69 | −7.66 | 37.98 | −1.19 | 0.68 | −0.31 | 1.41 |
| Fe$_2$O$_3$-coated Al | 8.06 | 25 | 40.47 | −17.81 | −3.28 | 8.24 | −0.01 | −0.01 | −0.06 | 0.06 |
| blue | 17.12 | 45 | 22.53 | −11.19 | −1.51 | 17.54 | 0.26 | −0.17 | 0.14 | 0.34 |
| carbon black | 12.89 | 75 | 12.47 | −7.53 | −3.49 | 13.11 | 0.14 | −0.04 | 0.17 | 0.22 |
| yellow | 13.09 | 110 | 8.94 | −6.14 | 4.22 | 13.24 | 0.04 | 0.02 | 0.45 | 0.45 |
| effect additive | 3.02 | | | | | 3.02 | | | | |

We claim:

1. A method for matching a colour shade formulation to a colour shade model in the field of a colour- and/or effect-imparting surface coating, comprising i) determining metrologically one or more reflectance spectra of a reflectance surface of a colour shade of a coloured surface coating wherein the reflectance spectra are determined over a required spectral region using a goniometric spectral photometer with variation of the angle of measurement, ii) calculating a set of associated standard tristimulus values and/or vectors in the CIELAB colour solid from the reflectance spectra, iii) identifying those colour shade formulations from a formulation database, which exhibit reflection properties or reflection derived properties which are the most similar to the reflectance spectra of the measured colour shade, iv) minimizing, with the aid of a computer-generated colour effect matrix, the metrologically determined, angle-dependent colour difference between the desired colour shade to be rematched, and the actual colour shade corresponding to the nearest formulation from the formulation database, wherein a computer algorithm for function minimisation, taking into consideration secondary conditions based upon an $L_2$ norm, is used with the colour effect matrix to produce a corrected formulation, and wherein the colour effect matrix is established by a) experimentally determining, by means of a calibration table and using a goniometric spectral photometer, the reflection surfaces for each pigment which forms the basis of the formulations from the formulation database at a plurality of angles within the required spectral region, b) determining the optical material parameter for each pigment forming the basis of the formulations from the formulation database by adapting a radiation transfer equation to the experimentally determined reflection surfaces, and c) determining by a computer using the radiation transfer equation, the colour effect matrix, which describes the angular dependency of the colouristic effect in the reflection solid or the colour solid when the pigment concentrations are varied, for the entire formulation content of the formulation database, and storage of the colour effect matrix in the database.

2. A method according to claim 1, wherein a lacquer and/or a surface coating is produced corresponding to the corrected formulation as a reference model and the method according to claim 1 is repeated using the reference model as the actual colour shade.

3. A method according to claim 2, wherein the method is reiterated repeatedly, and the reference model of the method operation is used each time as the actual colour shade of the following method operation.

* * * * *